United States Patent [19]

Gregg

[11] Patent Number: 4,533,034

[45] Date of Patent: Aug. 6, 1985

[54] METHOD AND APPARATUS FOR AUTOMATICALLY SUPPLYING AND REMOVING PALLETS OF A PALLET MAGAZINE TO AND FROM THE WORKING SPACE OF A MACHINE TOOL

[75] Inventor: Hans Gregg, Woerthsee, Fed. Rep. of Germany

[73] Assignee: Carl Hurth Maschinen-und Zahnradfabrik GmbH & Co., Munich, Fed. Rep. of Germany

[21] Appl. No.: 407,182

[22] Filed: Aug. 11, 1982

[30] Foreign Application Priority Data

Aug. 25, 1981 [DE] Fed. Rep. of Germany ....... 3133588

[51] Int. Cl.$^3$ .............................................. B65G 37/00
[52] U.S. Cl. ...................................... 198/472; 198/345
[58] Field of Search ............... 198/345, 472, 487, 740, 198/741, 488, 339, 341, 648

[56] References Cited

U.S. PATENT DOCUMENTS

| | | | |
|---|---|---|---|
| 3,037,608 | 6/1962 | Rothschild | 198/488 |
| 3,384,097 | 5/1968 | Meeker et al. | 198/339 |
| 3,882,792 | 5/1975 | McIntier | 198/472 |
| 3,931,882 | 1/1976 | Ossbahr | 198/648 |
| 3,934,701 | 1/1976 | Mooney et al. | 198/345 |
| 3,949,859 | 4/1976 | Nussbaumer et al. | 198/648 |
| 4,088,220 | 5/1978 | Jacksch et al. | 198/472 |
| 4,106,632 | 8/1978 | Bossi | 198/487 |
| 4,144,960 | 3/1979 | Scourtes | 198/339 |
| 4,306,646 | 12/1981 | Magni | 198/341 |
| 4,442,935 | 4/1984 | Gregg | 198/648 |

FOREIGN PATENT DOCUMENTS

| | | | |
|---|---|---|---|
| 2732977 | 2/1979 | Fed. Rep. of Germany | 198/488 |
| 732181 | 5/1980 | U.S.S.R. | 198/345 |

Primary Examiner—Joseph E. Valenza
Assistant Examiner—Daniel R. Alexander
Attorney, Agent, or Firm—Flynn, Thiel, Boutell & Tanis

[57] ABSTRACT

A pallet magazine for automatically supplying and removing pallets, each carrying a workpiece, to and from the working space of a machine tool. The pallets, which rest freely and with any desired spacing from one another on moving chains which effect the transport thereof, are lifted off the chains at a waiting station and are then moved to the working station where the workpiece is machined. At the same time a pallet at the working station with a workpiece which has already been machined is placed back on the moving chains. For lifting, sliding and moving out or lowering the pallets, there is provided a hydraulically operated slide mechanism, which effects the sliding and moving of the pallets to and away from the working station more quickly than the pallets are transported on the chains.

11 Claims, 12 Drawing Figures

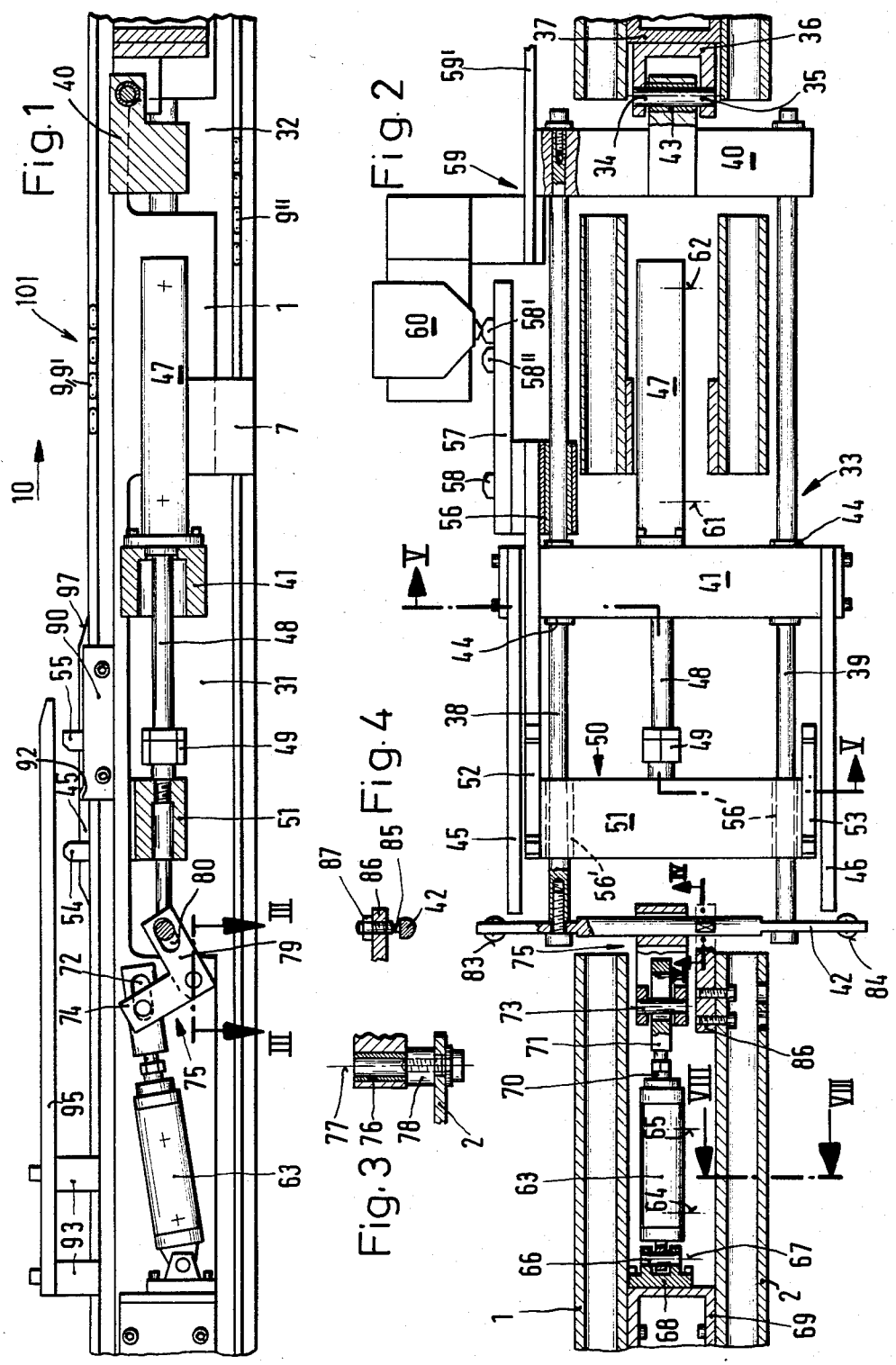

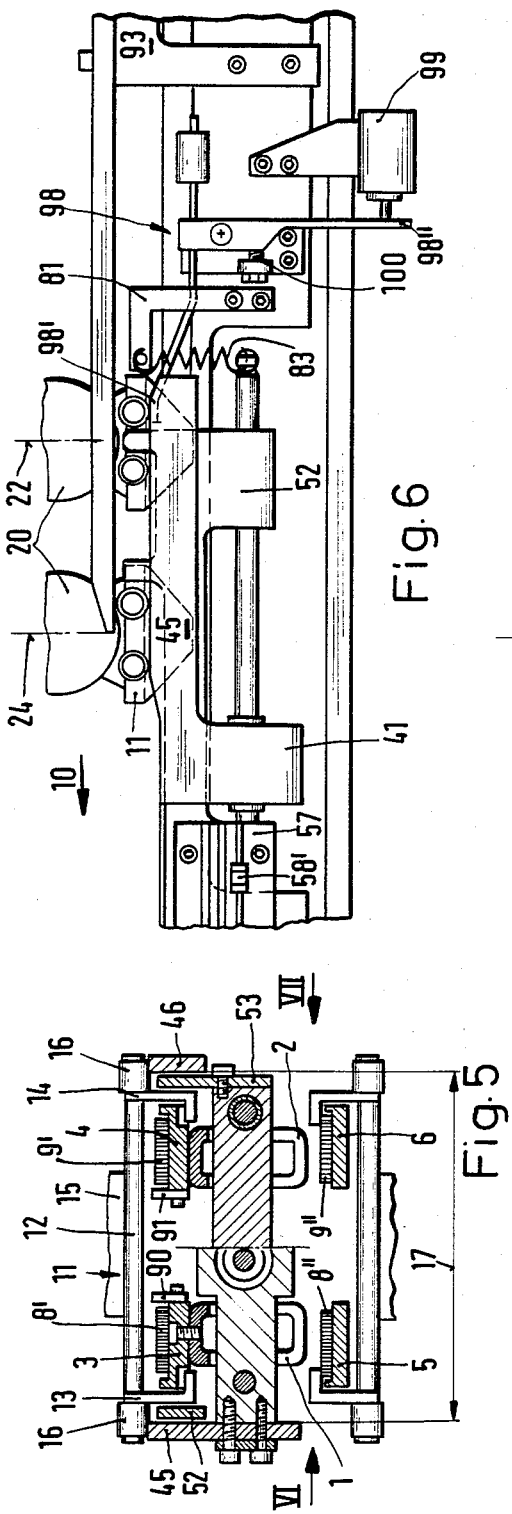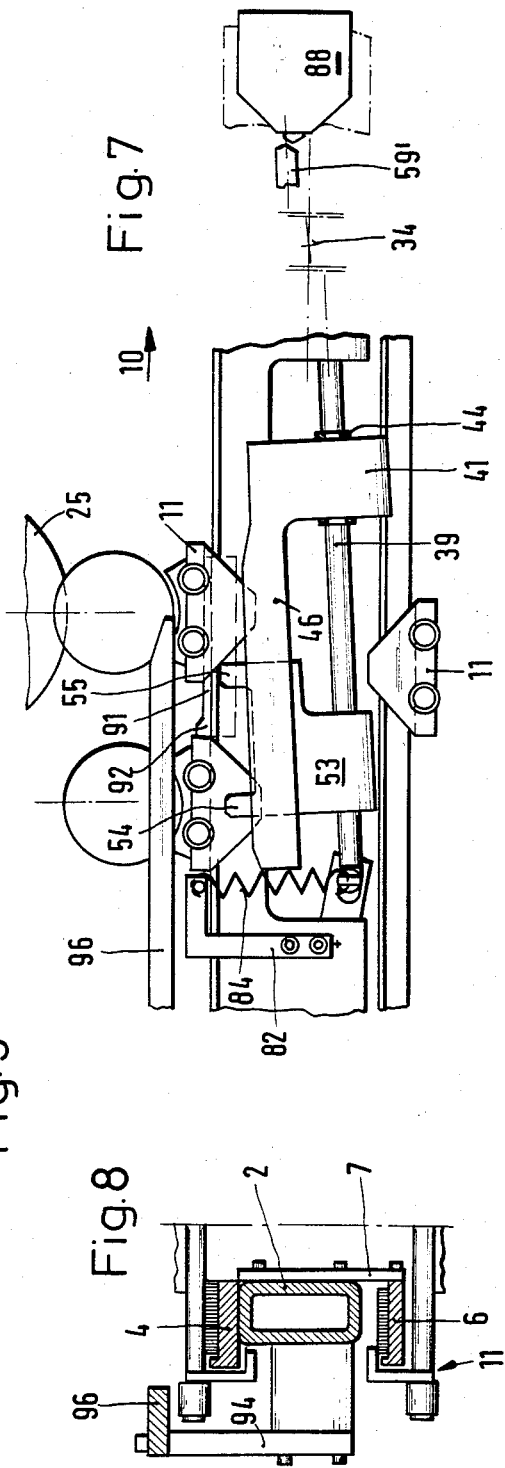

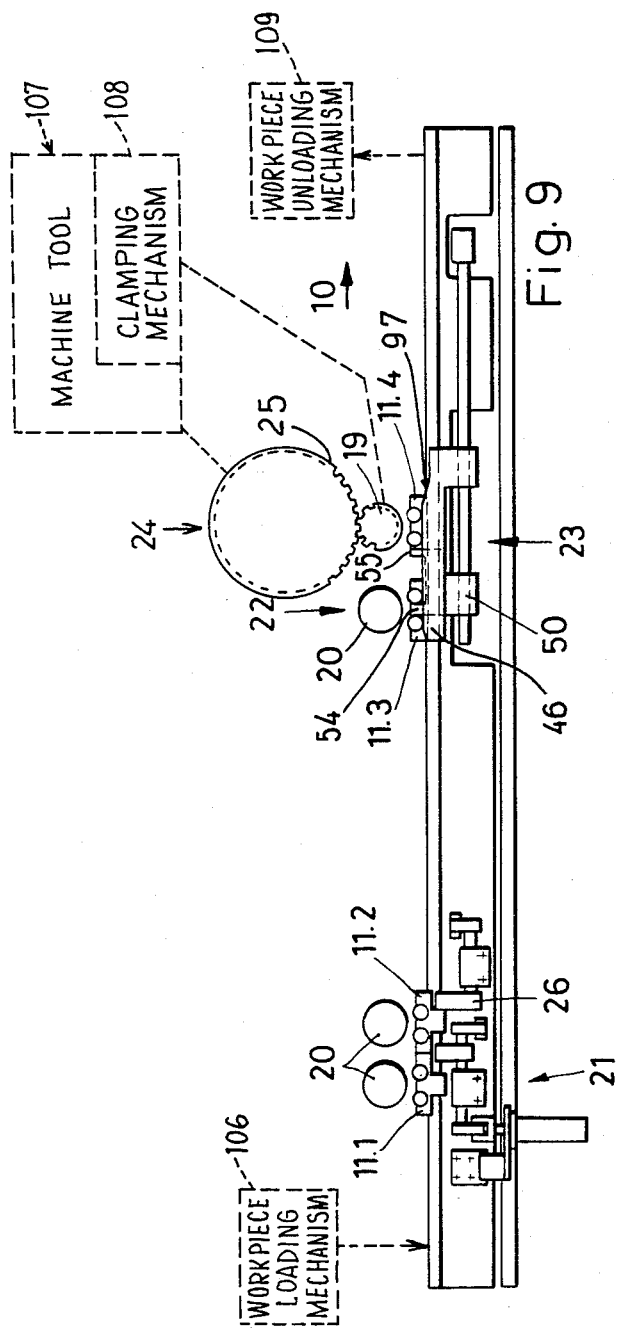

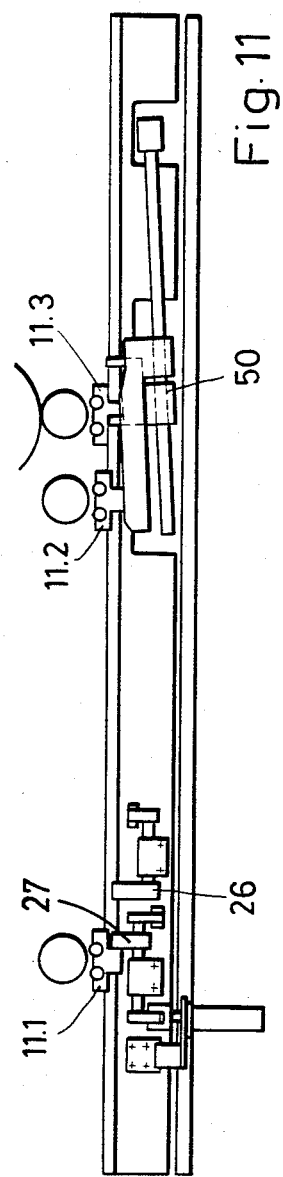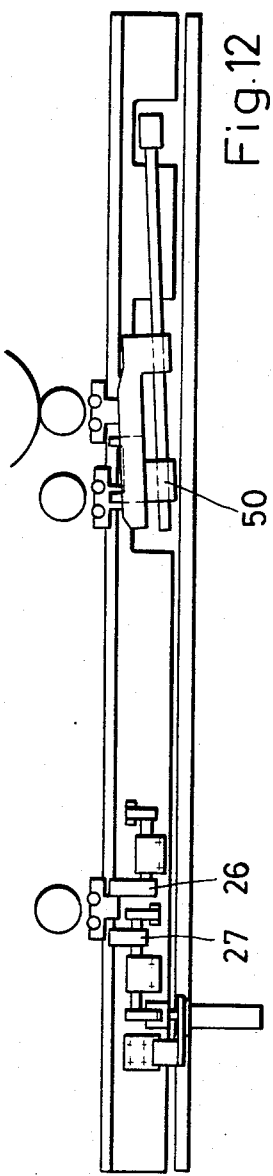

METHOD AND APPARATUS FOR AUTOMATICALLY SUPPLYING AND REMOVING PALLETS OF A PALLET MAGAZINE TO AND FROM THE WORKING SPACE OF A MACHINE TOOL

FIELD OF THE INVENTION

This invention relates to a method and apparatus for automatically supplying and removing pallets of a pallet magazine, which can each carry a workpiece, into and out of the working space of a machine tool and, more particularly, to such a method and apparatus in which the pallets rest loosely and at any desired distance from each other on rotating chains which effect transport of the pallets, the pallets being moved from a loading station, where they are each loaded with a workpiece to be machined, through a separating mechanism to the working space, where each workpiece to be machined is received by a clamping mechanism, is machined with a tool and is then released, and then being moved to an unloading station, where the machined workpieces are removed, the pallets thereafter returning along the underside of the magazine to the loading station.

BACKGROUND OF THE INVENTION

Such pallet magazines for supplying machine tools with workpieces which must be machined and for removing the machined workpieces therefrom are known. For some cases of use, however, for example gear shaving machines, they are not entirely suitable. More specifically, the workpieces move at the rotational speed of the chain, which typically is approximately 80 to 100 mm/sec, from the separating mechanism to the working space of the machine and then removed from the working space. As a result, the workpiece exchange times are too long in relationship to the actual machining time.

Therefore, a basic purpose of the invention is to provide a method and an apparatus suitable for carrying out such method, with which a quick workpiece exchange independent of the rotational speed of the chain can be carried out.

SUMMARY OF THE INVENTION

This purpose is attained according to the invention by providing a method in which each pallet carrying a workpiece to be machined is, after passing the separating mechanism, moved by the chains to a waiting station where it is lifted from the chains, is picked up by a slide mechanism, is moved on a guide to a working station and is there set down on a support. The slide mechanism, at the same time, moves a pallet which carries a machined workpiece and is already at the working station from the support back onto the chains, which then effect further transport of that pallet to the unloading station, the slide mechanism thereafter returning to its initial position. Thus, the respective frontmost pallet with a workpiece which must be machined is lifted from the rotating chains by means of a hydraulically or pneumatically operated slide mechanism and is moved to the working station of the machine tool. At the same time, a pallet which is already at the working station is moved with its workpiece which has already been machined back onto the chains. A slide mechanism adapted for carrying out this method includes two parallel guides which extend next to the pallet magazine in the region of the waiting station and the working station, are spaced from one another by a distance corresponding to the spacing between rollers provided laterally on the pallets, and are supported on a frame which is pivotal about a horizontal axis extending transversely of the magazine and disposed between the working station and unloading station, such pivotal movement occurring between a position in which the frame is inclined toward the waiting station and a horizontal position. A slide member is slidably supported on the frame and can be moved in the conveying direction in the horizontal position of the guides and can be moved opposite the conveying direction in the inclined position of the guides. A mechanism is provided for driving the slide member, and the guides thereon have cams which are operatively, simultaneously coupled to the pallet which is to be transported from the waiting station to the working station and also the pallet which is to be transported away from the working station. The swivelling movement of the frame is preferably effected by a hydraulic or pneumatic cylinder-piston unit which is arranged within the pallet magazine on the side of the frame opposite its swivel axis and extends approximately parallel to the conveying direction, the piston rod of such unit effecting movement of the frame through a toggle lever which has a pivot axis extending parallel to the frame swivel axis. The movement of the slide member is preferably effected by a hydraulic or pneumatic cylinder-piston unit which is arranged within the pallet magazine on the side of the frame which faces the swivel axis of the frame and is supported for pivotal movement with the frame, the piston rod of such unit being connected to the slide member. Such a slide mechanism requires almost no additional space outside of the actual pallet magazine, since the important parts are disposed within the magazine.

Also advantageous is a development in which the guides are directly or indirectly urged to their horizontal position by springs, movement thereof being limited by a stop. With this, the cylinder-piston unit which causes the swivelling movement need not constantly be supplied with pressurized fluid.

When the pallet magazine is supposed to supply preworked gears to a gearlike tool which meshes with the gears, a mechanism is advisable which can influence the movement of the slide member and, when the tool and workpiece engage tooth-tip to tooth-tip and swing the frame downwardly against the force of the springs, causes first a reverse movement of the pallet which carries the workpiece to be machined, during which movement the frame is pulled back to its horizontal position by the springs, and then causes resumption of movement of the pallet in the direction of the tool. With this, a tooth-tip to tooth-tip engagement which interferes with the sequence of operation can be remedied and a satisfactory tooth mesh can take place.

BRIEF DESCRIPTION OF THE DRAWINGS

The invention will be described hereinafter in connection with an exemplary embodiment which is illustrated in FIGS. 1 to 8 and an operating sequence which is illustrated in FIGS. 9 to 12.

In the drawings:

FIG. 1 is a longitudinal sectional side view of a mechanism embodying the present invention;

FIG. 2 is a sectional top view of the apparatus of FIG. 1;

FIG. 3 is a fragmentary sectional view taken along the line III—III of FIG. 1;

FIG. 4 is a fragmentary sectional view taken along the line IV—IV of FIG. 2;

FIG. 5 is a sectional view taken along the line V—V of FIG. 2;

FIG. 6 is a side view taken in the direction of arrow VI in FIG. 5;

FIG. 7 is a side view taken in the direction of arrow VII in FIG. 5 and illustrating an operational position in which the guides and cams are lowered;

FIG. 8 is a fragmentary sectional view taken along the line VIII—VIII of FIG. 2; and FIGS. 9 to 12 respectively and diagrammatically illustrate sequential steps of operation of the apparatus of FIG. 1 during a workpiece exchange.

DETAILED DESCRIPTION

Referring to FIGS. 5 and 8, a pallet magazine 101 (FIG. 1) of a conveying mechanism includes upper chain guides 3 and 4 and lower chain guides 5 and 6 supported below the upper guides 3 and 4 by plates 7, which are arranged on two longitudinal supports 1 and 2 (FIGS. 5 and 8). Endless chains 8 and 9 rest on the chain guides 3, 4, 5 and 6, and are each deflected 180° at each of two spaced sprocket wheels (not illustrated) so that upper chain strands 8' and 9' and lower chain strands 8" and 9" extend between such sprocket wheels. The chains 8 and 9 are driven by a drive mechanism which is also not illustrated, the upper chain strands 8' and 9' moving in a conveying direction 10. A plurality of pallets 11 rest freely on the upper chain strands 8' and 9' and are carried along by the continuously rotating chains due only to friction with the chains generated by their own weight. The pallets 11 each include a base plate 12 (FIG. 5), a cradle 15 for receiving a respective workpiece 20, and laterally spaced, downwardly pointing, inwardly bent angle plates 13 and 14. Furthermore, lateral rollers 16 are rotatably supported on the pallets 11 and serve as guide rollers which run on appropriately constructed surfaces described hereinafter. (FIGS. 1 and 2, for clarity do not show the pallets 11, and FIG. 2 also does not show the lower chain strands and guides).

The pallets 11 are loaded by a conventional loading mechanism 106 (FIG. 9) at a loading station with respective workpieces 20 which must be machined and carry such workpieces to a tool 25 of a machine tool 107 (FIG. 9). A separating mechanism 21 (FIG. 9) which is operated by a not illustrated control unit of the machine tool ensures that, at any given time, only one pallet reaches a waiting or pick up position 22, from which it is moved to a working station 24 in the working space of the machine tool by a slide or feed mechanism 23 which will yet be described in greater detail. The workpiece 20 is clamped at the working position 24 by a conventional mechanism 108 (FIG. 9) of the machine tool, is machined, and is then released. The associated pallet 11 remains stationary during this period of time. In the meantime, the next pallet 11 moves to the waiting position 22. It is then moved with the slide mechanism 23 to the working station 24 of the machine, and at the same time the pallet 11 with the machined workpiece 20, which pallet is already at the working station 24, is moved from the working station 24 to an unloading station where the workpiece 20 is removed by a conventional unloading mechanism 109. After passing the unloading station, the pallets 11 come to one set of the sprocket wheels supporting the chains 8 and 9. They are then rotated 180° and hang from the moving lower chain strands 8" and 9" by means of angle plates 13 and 14 until they come to the other set of sprocket wheels, where they are again rotated 180° and then move again to the loading station.

The slide mechanism 23 is illustrated in FIGS. 1 to 7. A frame 33 (FIG. 2) is supported for pivotal movement about a horizontal axis 34 located between the working station 24 and the unloading station on a pin 35, either within recesses 31 and 32 (FIG. 1) provided in the longitudinal supports 1 and 2 or next to the longitudinal supports 1 and 2 in the region of the waiting station 22 and the working station 24. The pin 35 is received in a clevis 36 which is secured on a connecting piece 37 extending between and secured to the two longitudinal supports 1 and 2. The frame 33 includes two parallel guide rods 38 and 39 of cylindrical cross section which are connected by three spaced webs 40, 41 and 42. The web 40 is pivotally supported on pin 35 by a bearing sleeve 43. The guide rods 38 and 39 are attached by screws to the outer webs 40 and 42, and the center web 41 is positionally secured with snap rings 44 or the like on the guide rods 38 and 39. Two guides 45 and 46 are mounted on opposite lateral sides of the middle web 41 and extend longitudinally toward the web 42 or toward the loading station. The spacing 17 between the guides 45 and 46 is chosen so that the pallets 11 can be supported by means of their rollers 16 on the guides 45 and 46. A fluid actuated cylinder-piston unit 47 disposed between the longitudinal supports 1 and 2 is also secured to the center web 41, and the piston rod 48 thereof is connected by a threaded coupling 49 to a slide member 50 which is slidably supported on the guide rods 38 and 39.

The slide member 50 includes a crossbeam 51 and two spaced cams 52 and 53, each of which has two spaced noses 54 and 55. The cam 52 extends beyond the middle web 41. It is slidably supported between the webs 40 and 41 on the guide rod 38 by a bearing sleeve 56. Similar bearing sleeves 56' are provided for slidably supporting the crossbeam 51. A cam support bar 57 is secured to the cam 52, on which bar cams 58, 58' and 58" are adjustably supported and cooperate with a switch 60 which is supported on web 40 by a support 59.

The parts mounted on the frame 33 are pivotal therewith about the axis 34. To carry out this pivotal movement, a fluid actuated cylinder-piston unit 63 is arranged on the side of the frame 33 opposite the axis 34 and is located between the longitudinal supports 1 and 2. The cylinder-piston unit 63 is supported for pivotal movement about a horizontal axis 67 by a pin 66 supported in a clevis 68 secured on a connecting piece 69 supported between the longitudinal supports 1 and 2. The end of its piston rod 70 supports a plate 71 having a slot 72 therein. A pin 73 extends through the slot 72 and is received on both sides of the plate 71 in openings in a slotted arm 74 of a toggle lever 75. The toggle lever 75 is supported by a bearing sleeve 76 (FIG. 3) for pivotal movement about an axis 77 on a pin 78 which is secured on the longitudinal support 2. The other arm 79 of the lever 75 has a slot 80 therein through which the web 42, which in this region has a cylindrical cross section, extends.

Supports 81 and 82 (FIGS. 6 and 7) are mounted on the longitudinal supports 1 and 2. Respective helical expansion springs 83 and 84 are supported on these supports and also on the web 42 and pull the frame 33 upwardly. The web 42 comes to rest, in the horizontal position of the frame 33, on a stop screw 85 (FIG. 4) which is screwed into a plate 86 secured on the longitudinal support 2. Unintended rotation of the screw 85 is prevented by a lock nut 87.

Supports 90 and 91 (FIGS. 1, 5 and 7) are arranged in the region of the working station on the inner sides of the upper chain guides 3 and 4, the upper sides of the supports 90 and 91 projecting above the chains 8 and 9 and having noses 92 which form a stop. Holders 93 and 94 (FIGS. 1 and 6 to 8) are provided on the longitudinal supports 1 and 2, which holders have bars 95 and 96 screwed thereon which extend above the slides 45 and 46 and the cams 52 and 53 in the region of the waiting and working stations. These bars 95 and 96 prevent the pallets from moving off the slides 45 and 46 when being moved upwardly by the web 42. This upward move will be discussed in detail below.

For controlling the pallet transport and the orderly sequence of pallet movement, a two-arm lever 98 (FIG. 6) and a switch 99 are also mounted on the support 1. One lever arm 98' projects next to and slightly beyond the guide 45 in the horizontal rest position of frame 33, and the other lever arm 98" engages a stop 100. When a pallet reaches the waiting station 22, one of the rollers 16 thereon presses down the lever arm 98' and the lever arm 98" is thus moved and operates the switch 99.

The slide mechanism operates as follows. According to FIG. 9, two pallets 11.1 and 11.2 which are loaded with workpieces 20 are at the separating mechanism 21. It is possible for a queue of further pallets supplied from the loading station to be on the left of the pallet 11.1. The pallet 11.2 is held by a catch 26 of the separating mechanism 21, whereby movement of the pallet 11.1 and possibly further pallets is stopped, the chains 8 and 9 sliding under the pallets. A pallet 11.3 is at the waiting station 22, and is also loaded with a workpiece 20 which must be machined. A further pallet 11.4, which carries a workpiece 19 which has already been machined, is at the working station 24 in the working space of the machine tool. The tool is only indicated and is identified with reference numeral 25. The slide mechanism 23 is, in FIG. 9, in a horizontal position which corresponds to FIGS. 5 and 6. The two pallets 11.3 and 11.4 rest with their rollers 16 on the guides 45 and 46, the noses 54 of the cams 52 and 53 being disposed between the rollers 16 of the pallet 11.3 which is at the waiting station 22 and the noses 55 thereof being disposed behind the rear rollers 16 of the pallet 11.4 which is at the working station 24.

Pressurized fluid is now supplied by a not illustrated control unit to the cylinder-piston unit 47 (FIG. 2) at the fluid connection indicated at 61, causing the piston rod 48 and the slide member 50, as seen in FIGS. 1 and 9, to move to the right and thus move the cams 52 and 53 to the right too. The pallet 11.4 is thereby moved down the ramps 97 of the guides 45 and 46 and is again placed onto the chains 8 and 9, and the pallet 11.3 is at the same time moved to the working station 24. This movement of the pallets is illustrated in FIG. 10 and occurs considerably faster than the transport of the pallets on the chains. The end of the movement of the slide member 50 is controlled by the cams 58 (FIG. 2), which operate the switch 60.

The cylinder-piston unit 63 (FIG. 2) is then supplied with fluid at the fluid connection indicated at 64, causing the piston rod 70 to move out and rotate the toggle lever 75, to the right, namely, clockwise. Thus, the web 42 is moved downwardly against the force of the springs 83 and 84 and, with this, the entire frame 33, including the parts connected to it, becomes inclined (FIG. 11). The pallet 11.3 will then rest on the supports 90 and 91 (FIG. 7). The workpiece 20 on the pallet 11.3 is, in the meantime, clamped by the clamping mechanism of the machine tool and is machined. The catch 26 of the separating mechanism 21 in the meantime releases the pallet 11.2, and it is moved to the waiting station 22 by the chains 8 and 9, where it comes to rest against the noses 92 on the supports 90 and 91. The pallet 11.1 is held by a catch 27.

As the next step (FIG. 12), the cams 52 and 53 are moved to a pick-up position below the waiting station 22. For this purpose, the cylinder-piston unit 46 is supplied with fluid at the fluid connection designated at 62, causing the piston rod 48 and the slide member 50 to move, as seen in FIGS. 1 and 12, to the left until the noses 54 are below the space between the rollers 16 of the pallet 11.2. Termination of this movement is controlled by the cams 58' and the switch 60. The catch 27 then releases the pallet 11.1, which is moved forward by the chains to the catch 26. The pallets, if any, provided behind it also move forward. The machining of the workpiece at the working station 24 is completed in the meantime.

As the last step, the frame 33, including the parts connected to it, is pivoted back to the horizontal position. For this, the cylinder-piston unit 63 (FIG. 2) is supplied with fluid at the fluid connection designated at 65. The piston rod 70 moves in and rotates the toggle lever 75, as seen in FIG. 1, to the left, namely, counterclockwise. Thus, the web 42, assisted by the springs 83 and 84, is moved upwardly into engagement with the stop 85. The pallet 11.2 is thereby lifted off the chains 8 and 9 and the pallet 11.3 is lifted off the supports 90 and 91 by engagement of their rollers 16 with the guides 45 and 46. The noses 54 of the cams 52 and 53 are between the rollers of the pallet 11.2 which is at the waiting station 22, and the noses 55 are behind the rear rollers 16 of the pallet 11.3 which is at the working station 24. The clamping mechanism 108 of the machine tool 107 then releases the workpiece and it again rests on the pallet 11.3. With this, the situation illustrated in FIG. 9 is again achieved, but with the positions of each of the pallets being offset one position in conveying direction.

When the workpieces 20 which are to be worked are preworked gears and the tool 25 is a gearlike tool, for example a shaving gear or the like for precision machining of the tooth flanks of the preworked gears, then it may occur that a workpiece 20 does not engage the tool 25 with their teeth meshed, but prior to reaching the working station 24 comes into a tip-to-tip tooth engagement in which the tool obstructs further movement of the workpiece or the pallet which carries it. In such a case, the frame 33 is swung away downwardly against the force of the springs 83 and 84, due to the vertical force which results from the tip-to-tip engagement and a continued supply of fluid to the cylinder-piston unit 47. The slot 72 in the plate 71 on the end of piston rod 70 of cylinder-piston unit 65 permits the necessary pivotal movement of lever 75 as the frame 33 swings downwardly. A switch 88 (FIG. 7) is thereby operated by an extension 59' (FIGS. 2 and 7) on the support 59, which switch first stops the further movement of the workpiece and then effects movement of the chains in the reverse direction until the workpiece 20 and tool 25 are separated from one another, and then switches the workpiece back into the original direction of movement 10. The contact between the tooth tips of the workpiece and the tool typically results in a small rotation of the two parts relative to one another so that, during a second approach to the working station 24, an orderly tooth mesh is, as a rule, achieved. If necessary, the reversal movement is repeated. The switch 88 is also operated when the frame 33, during the course of the workpiece exchange, swings downwardly or upwardly, but through a suitable connection with the switch 60, which is operated by the cams 58 and 58' to indicate the end position, the switch 88 is rendered temporarily ineffective. Stated differently, actuation of the switch 88 is effective only when the frame 33 is swung downwardly and the pallet which is to be moved to the working station 24 has not yet reached the working station.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of automatically moving pallets which can each carry a workpiece between a support member and a pallet magazine which has endless chain means, a plurality of said pallets resting loosely on and being moved by said chain means, comprising the steps of: loading a workpiece to be machined on each said pallet of said pallet magazine as it passes a loading station, said chain means then carrying the loaded pallets from said loading station to a separating mechanism; causing said separating mechanism to produce a predetermined spacing in the direction of movement of said chain means between successive said pallets passing it, said chain means thereafter carrying the pallets to a pick-up station; utilizing a slide mechanism to lift each said pallet at said pick-up station off said chain means and move it to and place it on said support member, and simultaneously utilizing said slide mechanism to pick up a said pallet previously placed on said support member and to place it back on said chain means at a location therealong which is spaced in said direction of movement of said chain means from said pick-up station, said chain means then carrying such pallet to an unloading station; causing a clamping mechanism of a machine tool to pick up the workpiece supported by said pallet on said support member; causing said machine tool to perform a machining operation on the workpiece held by said clamping mechanism; causing said clamping mechanism to return the workpiece to said pallet on said support member before such pallet is moved from said support member by said slide mechanism; removing the machined workpieces from said pallets on said chain means as said pallets pass said unloading station, and thereafter moving the unloaded pallets from a location on said chain means downstream of said unloading station to a location on said chain means upstream of said loading station.

2. An apparatus for automatically carrying workpieces to and from a machine tool, comprising: elongate conveyor means supported for lengthwise movement in a generally horizontal direction of movement; a plurality of pallets removably supported on said conveyor means for movement therewith, each said pallet being adapted to support a workpiece; loading means provided at a location along said conveyor means for loading a workpiece to be machined onto each said pallet passing thereby; separating means provided at a location along said conveyor means spaced in said direction of movement from said loading means for imparting a predetermined spacing in said direction of movement between successive said pallets passing thereby on said conveyor means; a support arrangement provided at a location along said conveyor means spaced in said direction of movement from said separating means and adapted to support one of said pallets thereon; a slide mechanism provided along said conveyor means in the region of said support arrangement and having means for lifting one said pallet from said conveyor means at a pick-up location spaced in said direction of movement from said separating means and placing such pallet on said support arrangement while simultaneously lifting a further said pallet from said support arrangement and placing it back on said conveyor means at a return location spaced in said direction of movement from said pick-up location, said machine tool having means for clamping the workpiece from each said pallet placed on said support arrangement, for machining such workpiece, and for then releasing such workpiece before the pallet is moved from said support arrangement by said slide mechanism; and unloading means provided at a location along said conveyor means spaced in said direction of movement from said return location for removing the workpiece from each said pallet passing thereby on said conveyor means.

3. The apparatus according to claim 2, wherein said slide mechanism includes: a frame which is supported for pivotal movement between first and second positions about a horizontal pivot axis extending approximately normal to said direction of movement; two spaced guide members provided on said frame in the region of said conveyor means, each said guide member having an elongate, upwardly facing surface thereon which extends approximately parallel to said direction of movement and is approximately horizontal in said first position of said frame, and which is inclined downwardly when said frame is in said second position; a slide supported on said frame for reciprocal movement between third and fourth positions in directions approximately parallel to said direction of movement when said frame is in said first position, said slide being farther from said pivot axis in said third position than in said fourth position and said slide traveling approximately in said direction of movement of said conveyor means as said slide moves from said third to said fourth position; means for effecting pivotal movement of said frame; and means for effecting movement of said slide relative to said frame; wherein said pallets each have rollers rotatably supported thereon at locations transversely spaced by a distance approximately equal to the distance between said surfaces on said guide members, pivotal movement of said frame from its second to its first position with said slide in its third position causing said surfaces on said guide members to engage said rollers on a first said pallet at said pick-up location of said conveying means and a second said pallet on said support arrangement and to lift said first and second pallets from said conveying means and support arrangement; and wherein said slide has cam means thereon engageable with said first and second pallets as said slide is moved from said third to said fourth position for effecting movement of said first and second pallets along said guide members in said direction of movement.

4. The apparatus according to claim 3, wherein said means for effecting pivotal movement of said frame includes a fluid actuated cylinder unit which is arranged on a side of said frame remote from said pivot axis of said frame and extends approximately parallel to said direction of movement of said conveying means, a piston rod of said cylinder unit being connected to a piston thereof, extending out of said cylinder unit and being operatively coupled to said frame by a lever supported for pivotal movement about an axis which extends parallel to said pivot axis of said frame.

5. The apparatus according to claim 4, wherein said means for effecting movement of said slide includes a further fluid actuated cylinder unit which is supported on said frame near said pivot axis of said frame, a piston rod of said further cylinder unit being connected to a piston thereof and being connected to said slide.

6. The apparatus according to claim 4, wherein said lever has two arms arranged at an angle to each other and is pivotally supported at a location in the region of the intersection of said arms, wherein one said arm has a slot therein extending approximately radially of the pivot axis of said lever and having slidably supported therein an element which is a portion of said frame, and wherein the other of said arms has a pin fixedly supported thereon which extends approximately parallel to the pivot axis of said lever; and wherein said piston rod of said cylinder unit has a member fixedly supported at the outer end of said piston rod and having a slot therein which extends approximately parallel to said piston rod, said pin on said lever being slidably received in said slot in said member on said piston rod.

7. The apparatus according to claim 3, wherein said slide mechanism includes springs which yieldably urge said frame toward said first position, and including stop means for preventing movement of said frame beyond said first position.

8. The apparatus according to claim 7, wherein said machine tool is a gear machining apparatus; wherein the workpieces to be machined are pretoothed gears which are moved into tooth mesh with a gearlike machining tool on said machine tool; and wherein said means for effecting movement of said slide includes means which, when said tool and a workpiece engage tooth-tip to tooth-tip and swing said frame downwardly toward said second position thereof against the urging of said springs, effects a reverse in the direction of movement of said slide and thus the pallet which carries the workpiece to be machined, whereby the workpiece and said tool are separated and said frame is pulled by said springs back to its first position, and which thereafter effects a further reverse in the direction of movement of said slide so that the workpiece and the tool are again moved into engagement.

9. The apparatus according to claim 3, wherein said conveyor means includes two movably supported endless chains which each have a reach extending approximately in said first direction, said reaches being transversely spaced and having said pallets supported thereon.

10. The apparatus according to claim 9, wherein said endless chains move synchronously and continuously; wherein said pallets are slidably supported on said chains, friction between said pallets and said chains causing said pallets to move with said chains in said direction of movement; and wherein said means for effecting movement of said slide moves said slide from said third to said fourth position thereof at a speed faster than the speed of movement of said conveyor means.

11. The apparatus according to claim 3, wherein said guide members each have a ramp surface thereon which is inclined downwardly in said direction of movement of said conveyor means and which merges at its upper end into said upwardly facing surface on the guide member, whereby a pallet supported by its rollers on said upwardly facing surfaces of said guide members and being moved along said upwardly facing surfaces by said cam means on said slide will, upon reaching said ramp surfaces, roll down said ramp surfaces and into engagement with said conveyor means at said return location.

* * * * *